Patented Sept. 21, 1954

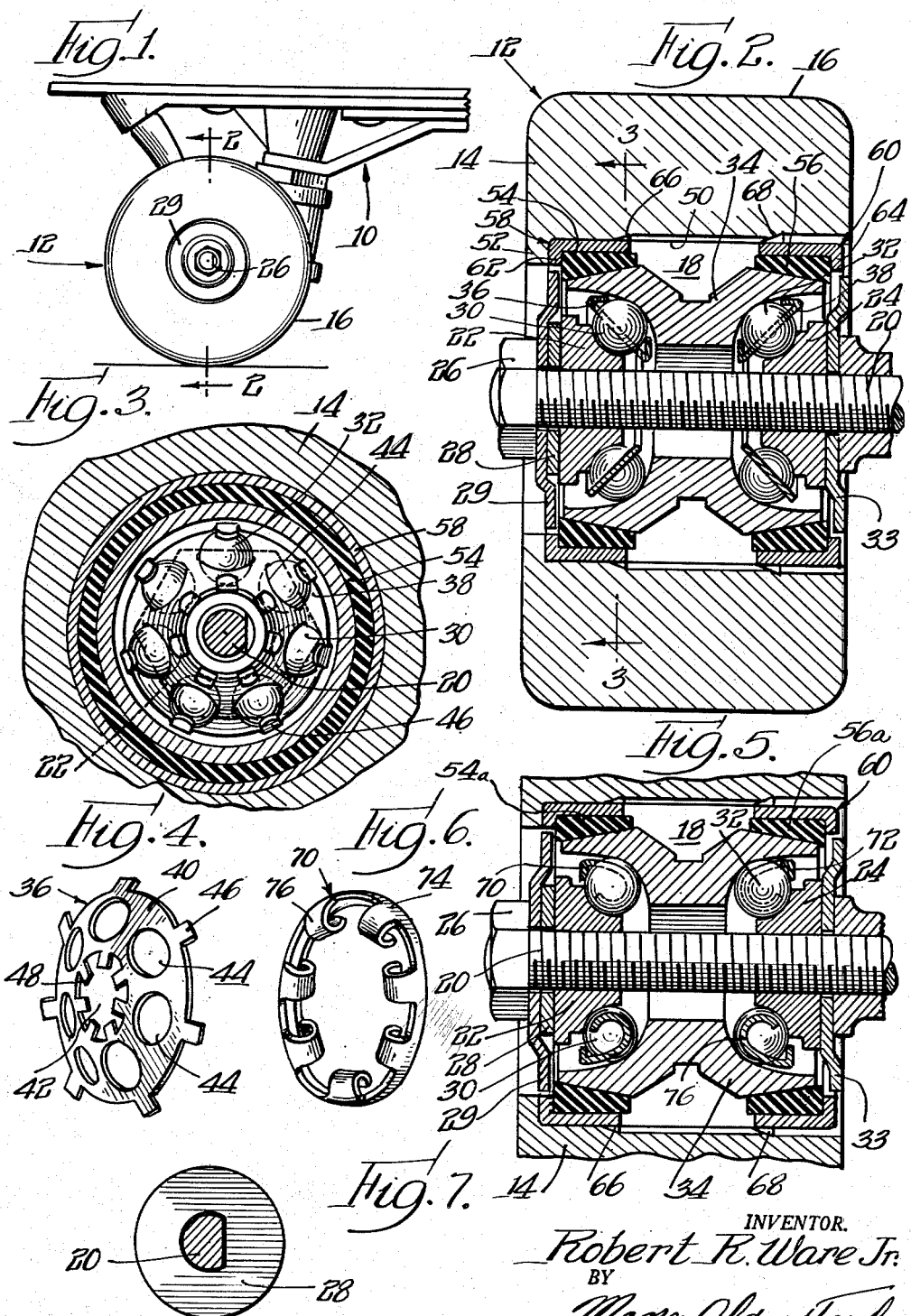

2,689,769

UNITED STATES PATENT OFFICE 2,689,769

SKATE ROLLER STRUCTURE

Robert R. Ware, Jr., Chicago, Ill., assignor to Chicago Roller Skate Company, Chicago, Ill., a corporation of Arizona Application March 5, 1949, Serial No. 79,865

2 Claims. (Cl. 301—5.7)

This invention relates to rollers and more particularly to rollers of the type used in roller skates and similar structures.

In rollers of the type set forth, it is frequently desirable to minimize shock and vibration transmission from the roller tread to the roller axle or from the axle to the tread as the case may be. More particularly when the roller is being used in a roller skate, shock and vibrations tend to be transmitted from the roller tread to the roller axle and thence to the user. The transmission of shock and vibration may be minimized somewhat by making the roller body of wood, fiber, or other non-metallic material. However, such structures frequently fail to provide the degree of shock absorption or suppression desirable.

It is also desirable to provide rollers of the type set forth which include antifriction members between the roller body and the axle to facilitate ease and smoothness of operation thereof. These antifriction members may comprise ball bearings or some similar type of bearing contained in races and positioned within these races at predetermined intervals. Such antifriction elements work best when the wheel and axle are well aligned. In roller skates having wood, fiber, or similar roller bodies the wheel and axle frequently become misaligned due to shrinking or warping of the roller body, or the supporting axle may become bent. It is desirable in such instances to provide a structure which under such conditions will continue to operate smoothly and easily with a minimum of transmission or vibrations and shock to the user.

In roller structures of the type referred to above, it heretofore has been necessary to adhere to close manufacturing tolerances in order to provide a smooth, free-running roller.

In accordance with the present invention means are provided for absorbing shock and vibration between the roller tread and the axle in combination with antifriction elements spaced at predetermined intervals in the bearing to produce a roller structure in which the roller body and the bearing axle tend to be self-aligning. This combination tends to reduce noise in the roller bearing by eliminating noises caused by misalignment of the bearing about the bearing axle. Still further the invention contemplates a structure which will give smooth and easy operation with more liberal manufacturing tolerances, thus reducing the cost of the roller.

It is an object of the invention to provide a roller structure of the type described of improved construction and improved operating characteristics.

More specifically it is an object of the invention to provide a type of roller structure of the type defined in which the roller body tends to align itself about the bearing axle.

A further object of the invention is to provide a roller structure of the type defined which is less noisy in use.

Yet another object of the invention is to provide a roller structure of the type defined which requires lower manufacturing tolerances of the bearing parts, thus reducing the cost of manufacture.

Still another object of the present invention is to provide a roller structure of the type defined which is smoother in operation and has improved characteristics of shock and vibration absorption between the roller body and the roller axle while in use.

Various other objects, advantages and features of the invention will be apparent from the following specification when taken in connection with the accompanying drawings wherein certain preferred embodiments are set forth for purposes of illustration.

In the drawings wherein like reference numerals refer to like parts throughout:

Figure 1 is a partial assembly view of a roller skate structure incorporating a roller constructed in accordance with and embodying the principles of the invention;

Figure 2 is an enlarged vertical section view of the roller illustrated in Figure 1 as seen in the direction of the arrows along line 2—2 of Figure 1;

Figure 3 is a partial sectional view of the structure of Figure 2 as seen in the direction of the arrows along the line 3—3 thereof;

Figure 4 is a perspective view of the ball bearing cage of the embodiment of the invention shown in Figure 2;

Figure 5 is a partial cross-sectional view similar to Figure 2 and showing a second embodiment of the present invention;

Figure 6 is a perspective view of the ball bearing cage shown in Figure 5; and

Figure 7 is a partial cross-sectional view showing the D-washer in position on the axle.

In the drawings the invention has been shown incorporated into a roller skate roller, a use in which it has particular advantage and utility. It is understood however that the roller may be used to advantage in various types of structures such, for example, as casters and conveyors wherein comparable operating problems are presented, or wherein the characteristics of the roller of the present invention may be desirable.

Referring more specifically to the drawings, in Figure 1 there is illustrated the forward portion of a roller skate, generally designated by the numeral 10, and which includes a wheel or roller 12 constructed in accordance with the present invention. Referring to Figure 2 it is seen that the roller 12 comprises an annular body member 14 preferably of wood, fiber, or like material having a tread surface 16 and a central chamber 18 within which is disposed an axle 20 and other parts which are hereinafter described.

The axle 20 may be of any desirable type or kind and in the embodiment shown has a D-shaped end section as best seen in Figure 7. Axle 20 provides a support for a pair of ball races 22 and 24 which are properly held in position upon the axle by screw threaded connection therewith and by means of a lock nut 26 cooperating with a D-washer 28 (see Figure 7) mounted on the axle end. A dust cap 29 is positioned between the lock nut and washer as shown. Two sets of antifriction bearing balls 30 and 32 form a rolling engagement between the non-rotatable races 22 and 24 and an annular bushing 34 carried within and rotatable with the wheel body 14. A second dust cap 33 provides protection for the race 24 and associated balls 32.

In the embodiment of the invention shown in Figures 2-4 bearing balls 30 and 32 are held in predetermined spaced relationship around the axle 20 by means of cages 36 and 38 respectively. Each of these cages, the blank one of which is shown in Figure 4, comprises a generally disk-shaped body portion 40 in the center of which is formed an aperture 42 through which passes the axle 20 when the cage is assembled in the roller. Disposed at regular intervals near the periphery of the body 40 are ball receiving apertures 44 which receive the bearing balls 30. Resilient ball engaging fingers 46 are formed integrally on the periphery of the body 40. Corresponding resilient fingers 48 are formed on the periphery of the central aperture 42. Upon assembly, fingers 46 and 48 are bent from the position shown in Figure 4 into the position shown in Figure 2 in which position they tend to hold the balls 30 in the ball receiving apertures 44. The ball cages 36 and 38 are made of any suitable material such as steel or brass.

The annular central chamber 18 in the wheel body 14, within which the bushing 34 is disposed, is defined by an angularly extending cylindrical surface 50 and a radially inwardly extending lip or flange formed on the body at one end of the central chamber as indicated by the numeral 52. The bushing 34 is provided with surfaces shaped to receive the balls 30 and 32 and is also provided along its outer annular wall with a pair of oppositely tapered frusto-conical surfaces shaped to receive and support a pair of mounting members or rings 54 and 56 of rubber or similar material having desired properties of toughness and resilience. These mounting rings 54 and 56 extend circumferentially around the outer wall of the bushing 34 and have a cross-section shown in Figure 2.

The outer and end face surfaces of the mounting rings 54 and 56 are engaged by and received within a pair of retainer members or rings 58 and 60. These retainer members 58 and 60 are annular in shape and have an outer circumference corresponding to that of the cylindrical surface 50 of wheel body 14. Formed on the outermost edges of the retainer rings 58 and 60 are inwardly directed end flanges 62 and 64 respectively. On the other edge of retainer members 58 and 60 are formed a series of anchoring lugs 66 and 68 disposed along the edge at suitably spaced intervals. These lugs 66 and 68 are shaped to provide biting edges which dig into the body 14 of the roller to hold the retainer members 58 and 60 in position.

The retainer members 58 and 60 are press fitted into position and are firmly mounted within the central chamber 18 of the roller body 14 by means of the anchorage lugs 66 and 68, and provide firm support for maintaining the resilient mounting rings 54 and 56 in position. Retainer member 58 abuts the inwardly extending flange 52 of the roller 12.

In assembling the roller structure the retainer member 58 is first inserted into the body after which the mounting ring 54, the bushing 34, and the mounting ring 56 may be sequentially assembled. Retainer member 60 is then inserted into the body chamber 18. The bearing balls, the bearing races and the axle are then assembled in position.

In operation it will be seen that the resilient mounting rings 54 and 56 are interposed between the body 14 and the axle 20, providing a vibration and a shock absorbing structure whereby to minimize shock transmission from the axle to the roller body or from the roller body to the axle as the case may be. These resilient mounting rings 54 and 56 will also tend to absorb or dampen the noises incident to the operation of the bearing balls 30 and 32 within their respective cages 36 and 38.

As can be seen from Figure 2, the resilient mounting and the disposition of the balls at fixed intervals about the axle 20 allows the axle 20 to seek and maintain the geometric center of the roller body 14 since the resilient member may be depressed sufficiently to compensate for any slight wear or warping. This action will tend to make the operation of the roller more smooth by eliminating any bumping which would tend to take place when the roller is operating with the axle off center. If the axle 20 becomes slightly bent, the rubber mounting in cooperation with the equally spaced bearing balls will allow the roller body to again shift to such a position that the tread surface 16 firmly contacts the supporting surface. This is accomplished by depressing the resilient mounting material at the proper points.

By providing a cage for the bearing balls, the improved operation characteristics inherent therein are achieved and when such a bearing arrangement is used in conjunction with the resilient mounting, the manufacturing tolerances need not be so close as heretofore used. Because of the self-aligning action described above slight variances in dimension of parts are readily compensated for by the resilient mounting.

Figures 5 and 6 show a second embodiment of the invention. The structure of this embodiment is similar to that of the embodiment shown in Figures 2-4, the difference lying in the form of the bearing ball cages 70 and 72. Thus cage 70 consists of an annular ring 74 from one side of which project bearing ball retaining fingers 76. The retaining fingers 76 are spaced at equidistant intervals around the circumference of the cage 70. The interaction between the ball bearing structure and the resilient rings 54a and 56a is the same as that explained above in detail for the embodiment of the invention shown in Figures 2-4.

It is obvious that various changes may be made in the particular embodiments set forth without departing from the spirit of the invention. The invention is accordingly not to be limited to the particular embodiments shown and described but only as indicated in the following claims.

The invention is hereby claimed as follows:

1. A wheel and axle assembly for a roller skate comprising an axle, an annular bushing surrounding said axle and being spaced away therefrom, said bushing having formed on opposite ends thereof concave and oppositely directed ball bearing surfaces, a pair of ball bearing races mounted on said axle and having concave ball bearing engaging surfaces positioned opposite the ball bearing engaging surfaces on said bushing and spaced therefrom a distance to accommodate ball bearings, a plurality of ball bearings disposed in the spaces between said races and said bushing, a spacer member for each set of ball bearings engaging said ball bearings and spacing said ball bearings at predetermined intervals, said spacer member engaging only said ball bearings, and comprising a frusto-conical shaped annular member surrounding the axle and having ball bearing receiving apertures formed therein, and resilient fingers formed integrally on said annular member to hold the ball bearings in said apertures, certain of said fingers extending substantially parallel to the axle and certain of said fingers extending substantially perpendicular to the axle, and a roller skate wheel body carried by said bushing.

2. A roller comprising a body having a central chamber, a bearing bushing within said chamber, a pair of rings of resilient material embracing the bushing adjacent the opposite ends thereof for supporting the bushing, means for anchoring said rings in position in respect to the body, said anchoring means comprising a pair of annular members respectively embracing the rings, an annular lip formed on the body in engagement with at least one of said annular members, said lip extending radially inwardly and engaging the outer edge of said last mentioned annular member, an axle extending through said chamber and said bushing, a pair of ball bearing races mounted on said axle and having ball bearing engaging surfaces opposite complemental ball bearing engaging surfaces on said bushing, a plurality of ball bearings disposed in the spaces between said races and said bushing, a spacer member for each set of ball bearings and comprising a frusto-conical annular body surrounding the axle and having ball receiving apertures therein to receive and space the ball bearings at predetermined intervals, and resilient fingers formed on said body to hold the ball bearings in said apertures, some of said fingers extending generally parallel to the axle and others extending generally perpendicular to the axle, and a roller skate wheel body carried by said bushing.

References Cited in the file of this patent

UNITED STATES PATENTS

| Number | Name | Date |
|---|---|---|
| 635,575 | McHugh | Oct. 24, 1899 |
| 645,715 | Creager | Mar. 20, 1900 |
| 1,080,082 | Sparks | Dec. 2, 1913 |
| 1,448,152 | Ricke | Mar. 13, 1923 |
| 1,566,609 | Larsen | Dec. 22, 1925 |
| 1,795,821 | Baldwin | Mar. 10, 1931 |
| 1,851,561 | Baninger | Mar. 29, 1932 |
| 2,141,122 | Boden | Dec. 20, 1938 |
| 2,304,944 | Martinec | Dec. 15, 1942 |
| 2,407,388 | Smith et al. | Sept. 10, 1946 |
| 2,476,193 | Hirschmugl | July 12, 1949 |
| 2,519,927 | Pedu | Aug. 22, 1950 |
| 2,670,242 | Beckman | Feb. 23, 1954 |

FOREIGN PATENTS

| Number | Country | Date |
|---|---|---|
| 22,233 of 1892 | Great Britain | Oct. 7, 1893 |
| 15,216 | Great Britain | 1909 |